United States Patent
Onoe et al.

(10) Patent No.: US 10,071,368 B2
(45) Date of Patent: Sep. 11, 2018

(54) EXHAUST GAS PURIFICATION CATALYST

(71) Applicant: CATALER CORPORATION, Kakegawa-shi, Shizuoka (JP)

(72) Inventors: Ryota Onoe, Kakegawa (JP); Shingo Sakagami, Kakegawa (JP); Yasutaka Nomura, Kakegawa (JP); Yuta Morishita, Kakegawa (JP); Junji Kuriyama, Kakegawa (JP); Hiroshi Sekine, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 0 days.

(21) Appl. No.: 15/550,252

(22) PCT Filed: Feb. 16, 2016

(86) PCT No.: PCT/JP2016/054434
§ 371 (c)(1),
(2) Date: Aug. 10, 2017

(87) PCT Pub. No.: WO2016/133087
PCT Pub. Date: Aug. 25, 2016

(65) Prior Publication Data
US 2018/0021767 A1 Jan. 25, 2018

(30) Foreign Application Priority Data
Feb. 17, 2015 (JP) .................................. 2015-028798

(51) Int. Cl.
*B01J 23/10* (2006.01)
*B01J 23/44* (2006.01)
(Continued)

(52) U.S. Cl.
CPC .......... *B01J 35/0006* (2013.01); *B01D 53/94* (2013.01); *B01J 23/63* (2013.01); *B01J 35/04* (2013.01);
(Continued)

(58) Field of Classification Search
CPC ... B01J 23/10; B01J 23/44; B01J 23/46; B01J 23/63; B01J 35/0006; B01J 35/04
See application file for complete search history.

(56) References Cited

U.S. PATENT DOCUMENTS 8,323,599 B2 * 12/2012 Nunan ................. B01D 53/945
423/213.2
8,394,348 B1 * 3/2013 Nunan ................. B01D 53/945
423/213.2
(Continued)

FOREIGN PATENT DOCUMENTS

DE 10 2005 005 663 A1 8/2006
DE 10 2010 055 147 A1 6/2012
(Continued)

OTHER PUBLICATIONS

Apr. 19, 2016 Search Report issued in International Patent Application No. PCT/JP2016/054434.
(Continued)

*Primary Examiner* — Cam N. Nguyen
(74) *Attorney, Agent, or Firm* — Oliff PLC

(57) ABSTRACT

An exhaust gas purification catalyst capable of stably maintaining and exhibiting excellent catalytic performance includes a wall-flow-type substrate, a first catalytic layer and a second catalytic layer. The first catalytic layer is provided to an internal portion of a partition wall in contact with an entrance cell. The second catalytic layer is provided to an internal portion of a partition wall in contact with an exit cell. The ratio ($D_2/D_1$) of the coating density $D_2$ of the
(Continued)

second catalytic layer to the coating density $D_1$ of the first catalytic layer is 1.01 to 1.4.

11 Claims, 3 Drawing Sheets

(51) Int. Cl.
*B01J 23/46* (2006.01)
*B01J 23/63* (2006.01)
*B01J 35/00* (2006.01)
*B01J 35/04* (2006.01)
*B01D 53/94* (2006.01)
*F01N 13/08* (2010.01)
*F01N 3/28* (2006.01)

(52) U.S. Cl.
CPC ............... *B01D 2255/1023* (2013.01); *B01D 2255/1025* (2013.01); *B01D 2255/9022* (2013.01); *B01D 2255/9155* (2013.01); *F01N 3/28* (2013.01); *F01N 13/08* (2013.01); *F01N 2370/02* (2013.01)

(56) References Cited

U.S. PATENT DOCUMENTS

| | | | | |
|---|---|---|---|---|
| 8,557,204 | B2 * | 10/2013 | Nunan | B01D 53/945 422/177 |
| 8,758,695 | B2 * | 6/2014 | Neubauer | B01D 53/944 422/177 |
| 8,968,690 | B2 * | 3/2015 | Nunan | B01D 53/945 422/177 |
| 9,347,349 | B2 * | 5/2016 | Blakeman | B01D 53/9431 |
| 9,352,279 | B2 * | 5/2016 | Greenwell | F01N 3/101 |
| 9,366,166 | B2 * | 6/2016 | Blakeman | B01D 53/9431 |
| 9,486,793 | B2 * | 11/2016 | Klingmann | B01J 37/024 |
| 9,789,443 | B2 * | 10/2017 | Greenwell | B01D 53/9454 |
| 2004/0175315 | A1 | 9/2004 | Brisley et al. | |
| 2006/0057046 | A1 | 3/2006 | Punke et al. | |
| 2009/0087365 | A1 | 4/2009 | Klingmann et al. | |
| 2011/0014099 | A1 | 1/2011 | Dornhaus et al. | |
| 2011/0030346 | A1 | 2/2011 | Neubauer et al. | |
| 2011/0201493 | A1 | 8/2011 | Goto et al. | |
| 2012/0058020 | A1 | 3/2012 | Takagi et al. | |
| 2013/0058848 | A1 * | 3/2013 | Nunan | B01D 53/945 423/213.5 |
| 2014/0301924 | A1 | 10/2014 | Morgan | |
| 2015/0152768 | A1 * | 6/2015 | Arulraj | F01N 3/2828 428/117 |

FOREIGN PATENT DOCUMENTS

| | | |
|---|---|---|
| EP | 2 275 194 A1 | 1/2011 |
| EP | 2 489 844 A1 | 8/2012 |
| JP | 2005-500147 A | 1/2005 |
| JP | 2007-185571 A | 7/2007 |
| JP | 2009-082915 A | 4/2009 |
| JP | 2010-269205 A | 12/2010 |
| JP | 2011-167582 A | 9/2011 |
| JP | 2013-099748 A | 5/2013 |
| JP | 2014001679 A | 1/2014 |
| WO | 0112320 A1 | 2/2001 |
| WO | 2010/004320 A2 | 1/2010 |
| WO | 2010/110298 A1 | 9/2010 |
| WO | 2011/125771 A1 | 10/2011 |

OTHER PUBLICATIONS

Apr. 19, 2016 Search Report issued in International Patent Application No. PCT/JP2016/054432.
Dec. 12, 2017 extended European Search Report issued in European Application No. 16752471.9.
Jan. 12, 2018 Office Action issued in U.S. Appl. No. 15/550,078.
Dec. 15, 2017 Extended European Search Report issued in European Application No. 16752473.5.

* cited by examiner

→ Running direction
(axial direction of cylinder)

EXHAUST GAS PURIFICATION CATALYST

TECHNICAL FIELD

The present invention relates to an exhaust gas purification catalyst provided to an exhaust system of an internal combustion system. In particular, it relates to a wall-flow-type exhaust gas purification catalyst.

The present application is a national stage application of PCT/JP2016/054434, filed Feb. 16, 2016, which in turn claims priority to Japanese Patent Application No. 2015-28798 filed on Feb. 17, 2015; the entire contents of which are incorporated herein by reference.

BACKGROUND ART

Exhaust gas emitted from an internal combustion system such as an automobile engine comprises toxic components such as hydrocarbons (HC), carbon monoxide (CO), nitrogen oxides ($NO_X$), and particulate matter (PM). Conventionally, to efficiently eliminate these exhaust components, an exhaust purification catalyst having a catalytic layer is used, with the catalytic layer comprising a carrier and a catalytic metal supported on the carrier.

For instance, a wall-flow-type exhaust gas purification catalyst comprises a wall-flow-type substrate and a catalytic layer. The wall-flow-type substrate has an entrance cell that is open on the exhaust inlet-side end, an exit cell that is open on the exhaust outlet-side end, and a porous partition wall (a ribbed wall) separating the two cells. The catalytic layer is provided to the interior or to the surface of the partition wall. Exhaust gas emitted from the internal combustion system flows via the exhaust inlet-side end into the entrance cell, passes through micro pores of the porous partition wall, and flows out of the exhaust outlet-side end of the exit cell. During this, upon contact between the exhaust gas and the catalytic layer (catalytic metal), the exhaust components are purified (detoxified).

As for the conventional art documents related to this, Patent Documents 1 to 3 are cited. For instance, Patent Document 1 discloses an exhaust gas purification catalyst comprising a catalytic layer having a two-layer structure. In particular, it discloses an exhaust gas purification catalyst that has a first catalytic layer in the entire interior of the partition wall and a second catalytic layer over the entire surface of the partition wall to completely cover the first catalytic layer.

CITATION LIST

Patent Literature

[Patent Document 1] Japanese Patent Application Publication No. 2009-82915
[Patent Document 2] Japanese Patent Application Publication No. 2007-185571
[Patent Document 3] Japanese Patent Application Publication No. 2014-1679

SUMMARY OF INVENTION

Lately, eco-friendly cars with energy-saving systems such as hybrid engines and stop-start systems have gained popularity. In such an eco-friendly car, the engine stops and starts repeatedly when the car makes temporary stops while driving or waiting at traffic lights. Thus, in such an eco-friendly car, as the engine stops and restarts, the exhaust gas temperature may become unstable or may temporarily fall below the catalyst activation temperature. As a result, the exhaust gas purification performance may degrade temporarily or intermittently. Thus, there is a demand for an exhaust gas purification catalyst capable of stably maintaining and exhibiting catalytic performance even in such a mode of use.

The present invention has been made in view of these circumstances with an objective to provide an exhaust gas purification catalyst that comprises a wall-flow-type substrate and is able to stably maintain and provide excellent catalytic activities.

The present inventors have conducted many studies in various aspects to find a solution to the problem in exhaust gas purification catalysts comprising wall-flow-type substrates. As a result, they have conceived an idea of adjusting the pressure loss in the running direction of the partition wall to control the exhaust gas flow and increase the warm-up performance and the heat retention of an exhaust gas purification catalyst. Upon further studies, the present invention has been completed.

In particular, the present invention provides a wall-flow-type exhaust gas purification catalyst to be placed in an exhaust pipe of an internal combustion system to purify exhaust gas emitted from the internal combustion system. The exhaust gas purification catalyst comprises a substrate having a wall-flow structure (or simply a wall-flow substrate, hereinafter), a first catalytic layer, and a second catalytic layer.

In the wall-flow substrate, an entrance cell that is open on the exhaust inlet-side end and an exit cell that is open on the exhaust outlet-side end are separated with a porous partition wall. The first catalytic layer is provided to an internal portion of the partition wall in contact with the entrance cell, having a length $L_1$ from the exhaust inlet-side end in the running direction of the partition wall with $L_1$ being less than the total length $L_w$ of the partition wall in the running direction. The second catalytic layer is provided to an internal portion of the partition wall in contact with the exit cell, having a length $L_2$ from the exhaust outlet-side end in the running direction of the partition wall with $L_2$ being less than the total length $L_w$ of the partition wall in the running direction. In the internal portion of the partition wall in contact with the entrance cell, near the exhaust outlet-side end, the catalyst has a substrate-exposing segment free of the first and second catalytic layers. The ratio ($D_2/D_1$) of the coating density $D_2$ of the second catalytic layer to the coating density $D_1$ of the first catalytic layer is 1.01 or higher, but 1.4 or lower. In other words, the coating density ratio ($D_2/D_1$) satisfies the next inequality $1.01 \leq D_2/D_1 \leq 1.4$.

In the exhaust gas purification catalyst, the interior of the partition wall of the substrate is provided with the two catalytic layers satisfying the coating density ratio ($D_2/D_1$) of 1.01 to 1.4, whereby the exhaust gas flow (e.g. the flow field and the flow rate of exhaust gas) is adjusted. In other words, the pressure loss is relatively high at the second catalytic layer, making the second catalytic layer less permeable to exhaust gas. In such an embodiment, upon entering the entrance cell via the exhaust inlet-side end, exhaust gas is more likely to pass through where the second catalytic layer is not formed in the partition wall (typically where the first catalytic layer is formed, in particular, the vicinity of the exhaust inlet-side end). This causes active purification reactions upstream of the exhaust gas purification catalyst (in the first catalytic layer) to generate heat of reaction. The heat of reaction can be transferred with the exhaust gas flow downstream of the exhaust gas purification catalyst (to the second catalytic layer), thereby increasing the warm-up performance and the heat retention of the exhaust gas purification catalyst. Thus, for instance, even in an embodiment where, as the engine stops and restarts, the exhaust gas temperature becomes unstable or temporarily falls below the catalyst activation temperature, excellent catalytic activities can be stably maintained and exhibited.

As used herein, the term "coating density" refers to the coating amount (g) of a catalytic layer per L volume of substrate (total bulk volume including the cell volume). The unit is g/L.

For instance, a reference substrate prior to catalytic layer coating and a catalytic layer-bearing substrate are individually suspended in a solvent (e.g. in water); their masses in the solvent are determined by the Archimedes method; and the coating density can be determined by the next equation (1):

$$\rho = W \times \rho(l)(W - W') \qquad (1)$$

Here, $\rho$ is the coating density (g/L) of the catalytic layer, W is the mass of the catalytic layer in the atmosphere determined by subtracting the mass of the reference substrate in the atmosphere from the mass of the catalytic layer-bearing substrate in the atmosphere; $\rho(l)$ is the density of the solvent (e.g. water).

As used herein, the concept of "(a catalytic layer) being provided to an internal portion of the partition wall" means that the catalytic layer is more heavily present (localized) in the inside of the partition wall than in the outside (typically on the surface) of the partition wall. For instance, when a partition wall cross section of the first catalytic layer is analyzed under an electron microscope, with the overall coating density over a length $0.1L_w$ from the exhaust inlet-side end in the running direction being 100%, it means that the density distribution of the coating present in the inside of the partition wall is typically 80% or higher, for instance, 90% or higher, or preferably 95% or higher, in particular, essentially 100%. Or, for instance, when a partition wall cross section of the second catalytic layer is analyzed under an electron microscope, with the overall coating density over a length $0.1L_w$ from the exhaust outlet-side end in the running direction being 100%, it means that the density distribution of the coating present in the inside of the partition wall is typically 80% or higher, for instance, 90% or higher, or preferably 95% or higher, in particular, essentially 100%. Thus, the concept should be clearly distinguished from, for instance, an embodiment where a catalytic layer is provided to the surface of a partition wall and some of the catalytic layer is unintentionally impregnated into the partition wall.

In a preferable embodiment of the exhaust gas purification catalyst disclosed herein, the length $L_1$ of the first catalytic layer in the running direction satisfies $0.5L_w < L_1 < L_w$. This can favorably increase the catalytic reactivity in the first catalytic layer to bring the effects of this invention to a higher level.

In a preferable embodiment of the exhaust gas purification catalyst disclosed herein, $D_2/D_1$ is 1.1 or higher, but 1.3 or lower. This can combine reduction of the pressure loss of the exhaust gas purification catalyst at large and the effects of this invention at a higher level.

In a preferable embodiment of the exhaust gas purification catalyst disclosed herein, $L_w$, $L_1$ and $L_2$ satisfy the next inequality $L_w < (L_1 + L_2) < 2L_w$. That is, the first and second catalytic layers are formed, partially overlapping each other in the running direction. With the two catalytic layers (the first and second catalytic layers) partially overlapping each other in the running direction, no fraction of exhaust gas flows through the partition wall without passing through a catalytic layer. Thus, exhaust gas can be more suitably purified (detoxified).

In a more preferable embodiment, $L_w$, $L_1$ and $L_2$ satisfy the next inequality $1.1L_w \leq (L_1 + L_2) \leq 1.3L_w$. In other words, in the running direction, the first and second catalytic layers overlap over a range of 10% to 30% of the total length $L_w$ of the partition wall. This can effectively inhibit the increase in pressure loss to bring the effects of this invention to a higher level.

In a preferable embodiment of the exhaust gas purification catalyst disclosed herein, the partition wall has a total thickness $T_w$, in a Direction Perpendicular to the Running Direction of the partition wall, the first catalytic layer has a thickness $T_1$, and the second catalytic layer has a thickness $T_2$, with $T_w$, $T_1$ and $T_2$ satisfying the next inequality $T_w < (T_1 + T_2) < 2T_w$. That is, the first and second catalytic layers are formed, partially overlapping each other in the thickness direction.

With the two catalytic layers (the first and second catalytic layers) partially overlapping each other in the thickness direction, the catalytic layers and exhaust gas will have increased opportunities for contact. Thus, exhaust gas can be more suitably purified (detoxified).

$D_1$ can be, for instance, 40 g/L or higher, but 100 g/L or lower. When the first catalytic layer has a coating density in such a range, while reducing the increase in pressure loss, the aforementioned effects can be better produced.

In a preferable embodiment of the exhaust gas purification catalyst disclosed herein, the first catalytic layer comprises rhodium. In the exhaust gas purification catalyst disclosed herein, exhaust gas prefers to flow through the first catalytic layer, whereby a relatively large amount of exhaust gas flows through where the first catalytic layer is formed in the partition wall. Thus, when a precious metal (here, rhodium) with high catalytic activities is placed in the first catalytic layer, the catalytic metal can work more effectively. As a result, for instance, the reduction activity ($NO_x$ purification performance) can be significantly enhanced.

In another preferable embodiment of the exhaust gas purification catalyst disclosed herein, the second catalytic layer comprises palladium. By this, toxic components of exhaust gas can be efficiently purified. As a result, the exhaust gas purification performance can be further enhanced.

DESCRIPTION OF EMBODIMENTS

Figure 1:
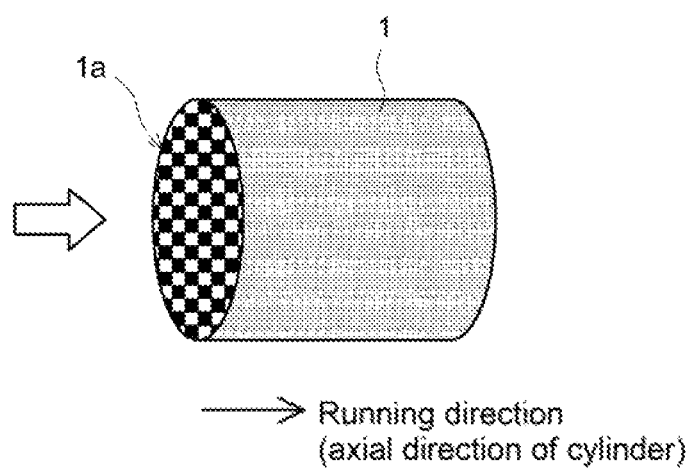
FIG. 1 shows a perspective diagram schematically illustrating the substrate in the exhaust gas purification catalyst according to an embodiment.

Some preferred embodiments of the present invention are described below with reference to drawings. In the drawings below, a common reference numeral may be assigned to members or sites producing the same effects, and duplicated descriptions are sometimes omitted or simplified. Dimensional relationships (length, width, thickness, etc.) in the respective drawings do not necessarily represent the accurate dimensional relationships. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

As used herein, the expression "A≈B (note: A and B are arbitrary values)" may include variation (differences among individual pieces) occurring during the manufacturing process. For instance, it means that the difference between A and B is about ±10%, typically about ±5%, or preferably about ±2%.

As used herein, "A to B (note: A and B are arbitrary values)" includes the values A and B (the minimum value and the maximum value).

The exhaust gas purification catalyst disclosed herein is a so-called wall-flow-type, comprising a wall-flow substrate and two catalytic layers (the first and second catalytic layers). Such an exhaust gas purification catalyst exhibits effects unique to the present invention, with the interior of the substrate provided with two catalytic layers and at least one substrate-exposing segment in a certain arrangement, and the ratio ($D_2/D_1$) of the second catalytic layer's coating density $D_2$ to the first catalytic layer's coating density $D_1$ satisfying the prescribed range. Thus, other features are not particularly limited and can be arbitrarily selected according to various standards.

For the substrate constructing the frame of the exhaust gas purification catalyst, various forms of substrates conventionally used for this type of application can be used.

FIG. 1 shows a schematic perspective view of substrate 1 in exhaust gas purification catalyst 10 according to an embodiment. This embodiment uses a honeycomb substrate (honeycomb structure) 1 having a cylindrical appearance. The appearance of the entire honeycomb substrate 1 can be, for instance, elliptic cylindrical, polygonal cylindrical, etc., instead of the cylindrical shape shown in FIG. 1. Honeycomb substrate 1 has partition walls formed in the running direction (in the axial direction of the cylinder) and several cells that are separated with the partition walls and arranged regularly. In honeycomb substrate 1, at one end 1a, open ends of the running direction are alternately sealed between adjacent cells.

Figure 2:
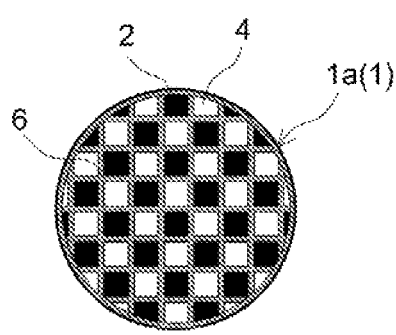
FIG. 2 shows a cross-sectional diagram schematically illustrating one end of the honeycomb substrate in FIG. 1.

FIG. 2 shows a schematic cross-sectional view of the end 1a of honeycomb substrate 1 in FIG. 1. In this embodiment, the end 1a is circular. At the end 1a, porous partition walls 6 are placed between adjacent cells. Sealing members 2 and openings 4 are arranged in a checkered pattern.

As the material of honeycomb substrate 1, various materials conventionally used for this type of application can be used. In view of harsh conditions under which internal combustion systems may be operated, it is preferably formed from a material having stable properties even when exposed to exhaust gas at a high temperature (e.g. 400° C. or above). Preferable examples include ceramic such as cordierite, aluminum titanate and silicon carbide (SiC), and alloys such as stainless steel.

Honeycomb substrate 1 has a storage capacity (a total cell volume) of typically 0.1 L or greater, or preferably 0.5 L or greater, it can be, for instance, 5 L or less, preferably 3 L or less, or more preferably 2 L or less. The overall length of honeycomb substrate 1 in the axial direction of the cylinder (i.e. the total length $L_w$ of a partition wall 6 in the running direction) can be typically 10 mm to 500 mm, for instance, about 50 mm to 300 mm.

Figure 3:
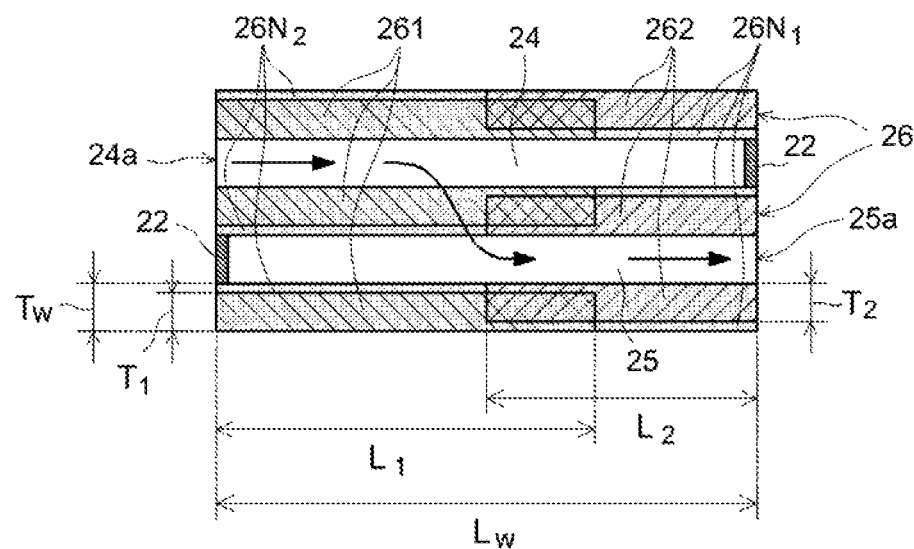
FIG. 3 shows a partial cross-sectional diagram schematically illustrating the structure in the vicinity of the partition wall of the exhaust gas purification catalyst according to an embodiment.

FIG. 3 shows a schematic partial cross-sectional view of the structure of exhaust gas purification catalyst 10 according to an embodiment, showing the vicinity of partition wall 26. In the substrate of exhaust gas purification catalyst 10 shown in FIG. 3, an entrance cell 24 (in a U shape) with an opening 4 on the exhaust inlet-side end 24a and an exit cell 25 (in a U shape) with an opening 4 on the exhaust outlet-side end 25a are separated with a porous partition wall 26. To the exhaust outlet-side end of entrance cell 24 and the exhaust inlet-side end of exit cell 25, sealing members 22 are provided to seal the cells.

For instance, entrance cell 24 and exit cell 25 can be designed to have shapes and dimensions suited in view of the flow rate and components of exhaust gas supplied to the exhaust gas purification catalyst 10, etc. The shape of entrance cell 24 or exit cell 25 is not particularly limited; for instance, it can be various geometric shapes such as quadrilaterals including square, parallelogram, rectangle and trapezoid; triangle, other polygon (e.g. hexagon, octagon), and circle.

Partition wall 26 has a porous structure permeable to exhaust gas. The overall thickness $T_w$ of partition wall 26 (i.e. the length of partition wall 6 in a direction perpendicular to its running direction) can be, for instance, about 0.05 mm to 2 mm from the standpoint of enhancing the exhaust purification performance, increasing the mechanical strength, reducing the increase in pressure loss, etc. The porosity of partition wall 26 can usually be about 40% to 70% from the standpoint of increasing the mechanical strength, reducing the increase in pressure loss, etc. The average pore diameter of partition wall 26 can usually be about 10 μm to 40 μm from the standpoint of increasing the PM-collecting ability, reducing the increase in pressure loss, etc.

Exhaust gas purification catalyst 10 disclosed herein comprises two catalytic layers having prescribed characteristics (e.g. lengths, thicknesses, and coating densities)—namely, the first catalytic layer 261 and the second catalytic layer 262—in the interior of partition wall 26 (in particular, inside the pores in partition wall 26). With the catalytic layers placed in the interior of partition wall 26, that is, with the first and second catalytic layers 261 and 262 not substantially (intentionally) provided to the surface of partition wall 26, it is possible to suitably obtain flow channels for exhaust gas while effectively reducing the increase in pressure loss.

In exhaust gas purification catalyst 10, exhaust gas released from an internal combustion system flows from the exhaust inlet-side end 24a into entrance cell 24. As indicated with the arrow in FIG. 3, upon entering entrance cell 24, the exhaust gas passes through pores in porous partition wall 26 and flows out of the exhaust outlet-side end 25a. In exhaust gas purification catalyst 10, while the exhaust gas passes through the interior of partition wall 26, it makes contact with the catalytic layers (the first catalytic layer 261 and/or the second catalytic layer 262). This purifies (detoxifies) toxic components of the exhaust gas. For instance, HC and CO in the exhaust gas are oxidized by the catalytic activities of a catalytic layer and converted (purified) to water ($H_2O$), carbon dioxide ($CO_2$), etc. $NO_x$ is reduced by the catalytic activity of a catalytic layer and converted (purified) to nitrogen ($N_2$). PM is unlikely to pass through pores in partition wall 26; and therefore, it generally accumulates on partition wall 26 in entrance cell 24 (e.g. near sealing member 22 on partition wall 26). The accumulated PM is decomposed by spontaneous combustion catalyzed by the first catalytic layer 261 or by forced combustion at a prescribed temperature (e.g. about 500° C. to 700° C.).

A structure contrasting to the wall-flow-type is the so-called straight type. In a straight-type exhaust gas purification catalyst, from early stages (upstream) to later stages (downstream) in the substrate, exhaust gas reacts with the catalytic layer(s) in order, whereby toxic components are purified. Thus, in the straight-type exhaust gas purification catalyst, catalytic metal species and the arrangement of the catalytic layer(s) (length, a layered structure in the thickness direction, etc.) are decided in view of the order of purification reactions. On the other hand, in the wall-flow-type exhaust gas purification catalyst disclosed herein, the arrangement and properties of the catalytic layers are decided in order to control the exhaust gas flow in the catalyst (in particular, through the partition wall). In this view, the wall-flow type is greatly different from the straight type in a technical sense.

Both the first and second catalytic layers 261 and 262 are provided to the interior of partition wall 26 in exhaust gas purification catalyst 10. When both the two catalytic layers are provided to the interior of partition wall 26, a large opening area of partition wall 26 can be obtained as compared to, for instance, an embodiment where at least one of the two catalytic layers is provided to the surface of partition wall 26.

The two catalytic layers serve as fields for exhaust gas purification, thereby constituting the main part of exhaust gas purification catalyst 10. In typical, each of the two catalytic layers comprises a catalytic metal serving as an oxidation and/or reduction catalyst, and a carrier supporting the catalytic metal.

As the catalytic metal, one, two or more species can be suitably selected among various metals known to serve as oxidation catalysts or reduction catalysts. Typical examples include precious metals such as rhodium (Rh), palladium (Pd) and platinum (Pt) of the platinum group. Alternatively, ruthenium (Ru), osmium (Os), iridium (Ir), gold (Au), silver (Ag), copper (Cu), nickel (Ni), iron (Fe) and cobalt (Co) as well as alloys of the precious metals and these metals can be used.

It is preferable to use the catalytic metal as fine particles with particle diameters that are small enough in view of increasing the contact area with exhaust gas. The average particle diameter (the average value of particle diameters determined by TEM analysis; the same applies hereinafter) of the catalytic metal particles is usually about 1 nm to 15 nm, preferably 10 nm or smaller, 7 nm or smaller, or even 5 nm or smaller.

The catalytic metals in the two catalytic layers (the first and second catalytic layers 261 and 262) may be the same or different.

In a preferable example, the first catalytic layer 261 comprises rhodium (Rh). In exhaust gas purification catalyst 10 disclosed herein, the exhaust gas flow is adjusted so that exhaust gas prefers to flow through the first catalytic layer 261. Thus, with the precious metal (e.g. rhodium) with high catalytic activities placed in the first catalytic layer 261, the purification performance (especially for $NO_x$) can be effectively enhanced even with the limited amounts of catalytic metals. With increased catalytic activities of the first catalytic layer 261, the temperature of exhaust gas purification catalyst 10 can be favorably maintained (kept warm). As a result, the effects of this invention can be brought to a higher level.

In another preferable example, one catalytic layer (e.g. the first catalytic layer 261) comprises a highly reducible metal (e.g. rhodium) and the other catalytic layer (e.g. the second catalytic layer 262) comprises a highly oxidizing metal (e.g. palladium). According to such an embodiment, toxic components of exhaust gas can be efficiently purified at once.

In each catalytic layer, the catalytic metal-carrying rate (the catalytic metal content with the carrier being 100% by mass) is not particularly limited. For instance, it can be decided in view of the lengths and thicknesses of the two catalytic layers 261 and 262, the flow rate of the exhaust gas supplied, etc.

In a preferable example, greater catalytic activities can be obtained when the catalytic metal-carrying rate in each catalytic layer is 0.05% to 1.5% by mass, preferably 0.1% to 1.5% by mass, or more preferably 0.2% to 1% by mass. When the carrying rate is at or above the prescribed value, excellent catalytic activities can be better obtained. When the carrying rate is at or below the prescribed value, particle growth (sintering) of the metal can be greatly inhibited to achieve high durability. It is also cost-effective.

The catalytic metal-carrying rate of the first catalytic layer 261 can be the same as or different from that of the second catalytic layer 262. In a preferable embodiment, the ratio of the catalytic metal-carrying rate of the first catalytic layer 261 to the catalytic metal-carrying rate of the second catalytic layer 262 is generally 1 to 1.5, for instance, 1 to 1.2. In particular, the catalytic metal-carrying rate of the first catalytic layer 261 is higher than that of the second catalytic layer 262. This can effectively increase the catalytic activity at the first catalytic layer 261 where exhaust gas prefers to flow through. As a result, active purification reactions occur at the first catalytic layer 261 to generate heat of reaction. With the exhaust gas flow, the heat of reaction can be efficiently transferred to the second catalytic layer 262, thereby increasing the warm-up performance and the heat retention of exhaust gas purification catalyst 10 at large. Thus, the catalytic metal can work effectively, thereby achieving greater catalytic performance.

As the carrier to support the catalytic metal, one, two or more species can be suitably used among inorganic materials similarly used in conventional exhaust gas purification catalysts. In particular, a porous material having a relatively large specific surface area (which refers to a specific surface area determined by the BET method; the same applies hereinafter) is preferable. Preferable examples include alumina ($Al_2O_3$), ceria ($CeO_2$), zirconia ($ZrO_2$), silica ($SiO_2$), titania ($TiO_2$), and solid solutions of these (e.g. a ceria-zirconia composite oxide (CZ composite oxide)).

From the standpoint of the heat resistance and the structural stability, the carrier (e.g. alumina powder, CZ composite oxide powder) may have a specific surface area of generally about 10 $m^2$/g to 500 $m^2$/g, for example, 200 $m^2$/g to 400 $m^2$/g. The carrier may have an average particle diameter of about 1 nm to 500 nm, for example, 10 nm to 200 nm.

The species of carrier in the two catalytic layers (the first and second catalytic layers 261 and 262) may be the same or different.

In addition to the aforementioned components, other optional components may be added to the two catalytic layers (the first and second catalytic layers 261 and 262). Such optional components may be included in each catalytic layer, for instance, as an additional element forming the carrier or as an entity independent from the carrier. One example of such additional components is a promoter carrying no catalytic metal, for instance, a ceria-zirconia ($CeO_2$—$ZrO_2$) composite oxide, alumina ($Al_2O_3$), and silica ($SiO_2$). Other examples include alkali metals, alkaline earth metals (e.g. barium), rare earth metal compounds and oxides, and composite oxides.

In exhaust gas purification catalyst 10 disclosed herein, the two catalytic layers (the first and second catalytic layers 261 and 262) have a coating density ratio in a prescribed range. In particular, the ratio ($D_2/D_1$) of the coating density $D_2$ in the second catalytic layer 262 to the coating density $D_1$ in the first catalytic layer 261 is 1.01 to 1.4. In other words, the coating density $D_2$ of the second catalytic layer 262 is 1.01 times to 1.4 times the coating density $D_1$ of the first catalytic layer 261. The difference in coating density between the first and second catalytic layers 261 and 262 creates an area readily permeable to exhaust gas in the running direction of partition wall 26 and a less permeable area, giving rise to a distribution of pressure loss. By this, the exhaust gas flow in partition wall 26 can be adjusted.

When $1.01 \leq D_2/D_1$ is satisfied, the pressure loss in the second catalytic layer 262 increases. This makes where the second catalytic layer 262 is formed in partition wall 26 less permeable to exhaust gas. Thus, upon entering entrance cell 24 via the exhaust inlet-side end 24a, exhaust gas prefers to flow through where the second catalytic layer 262 is not formed in partition wall 26 (typically the area where solely the first catalytic layer 261 is formed, e.g. the vicinity of the exhaust inlet-side end 24a). This causes active purification reactions upstream of the exhaust gas purification catalyst (in the first catalytic layer 261) to generate a large amount of heat of reaction (heat capacity). With the exhaust gas flow, the heat of reaction can be transferred downstream of exhaust gas (to the second catalytic layer 262), thereby increasing the warm-up performance and the heat retention of exhaust gas purification catalyst 10. Thus, for a longer period, the catalyst temperature can be stably kept at or above the catalyst activation temperature. By these effects, for instance, even in an eco-friendly car equipped with an energy-saving system that stops and restarts the engine repeatedly when the car makes temporary stops while driving or waiting at traffic lights, excellent catalytic activities can be stably maintained and exhibited. In addition, the efficiency of exhaust gas purification can be increased when exhaust gas at a temperature lower than the catalyst activation temperature flows in.

A favorable embodiment satisfies $1.1 \leq D_2/D_1$, for instance, $1.15 \leq D_2/D_1$. This can bring the aforementioned effects to a higher level.

When $D_2/D_1 \leq 1.4$ is satisfied, the exhaust gas flows smoothly from entrance cell 24 to exit cell 25. This can reduce the pressure loss of exhaust gas purification catalyst 10 at large. In addition, according to the studies by the present inventors, when the difference in pressure loss between the two catalytic layers 261 and 262 is excessively large, the flow rate of the exhaust gas increases, causing the exhaust gas to quickly pass through partition wall 26. This may unfavorably result in insufficient contact between the exhaust gas and the catalytic layers, thereby degrading the purification performance.

A favorable embodiment satisfies $D_2/D_1 \leq 1.3$, for instance, $D_2/D_1 \leq 138$. This can combine reduction of pressure loss in exhaust gas purification catalyst 10 at large and the effects of this invention at a higher level.

In a preferable embodiment, exhaust gas purification catalyst 10 has an overall average catalyst coating density $D_A$ of 40 g/L to 150 g/L. The pressure loss can be further reduced when the average catalyst coating density $D_A$ is 150 g/L or less, or preferably 120 g/L or less, for instance, 100 g/L or less. Greater exhaust gas purification performance can be obtained when the average catalyst coating density $D_A$ is 40 g/L or greater, or preferably 50 g/L or greater, for instance, 60 g/L or greater. Thus, the effects of this invention can be brought to a higher level.

The coating density $D_1$ of the first catalytic layer 261 is not particularly limited as it depends on the properties (e.g. the shape of cells, the thickness of the partition wall, the porosity) of the substrate. In a preferable example, from the standpoint of reducing the pressure loss (especially the surface pressure loss caused when the exhaust gas flows into exhaust gas purification catalyst 10), the coating density $D_1$ in the first catalytic layer 261 is generally 100 g/L or lower, preferably 80 g/L or lower, or more preferably 75 g/L or lower, for instance, 70 g/L or lower. In another preferable example, from the standpoint of increasing the catalytic activities upstream of exhaust gas to bring the effects of this invention to a higher level, the coating density $D_r$ in the first catalytic layer 261 is generally 40 g/L or higher, preferably 50 g/L or higher, or more preferably 55 g/L or higher, for instance, 60 g/L or higher.

The coating density 12 in the second catalytic layer 262 is not particularly limited as long as it satisfies the $D_2/D_1$ ratio. In a preferable example, from the standpoint of reducing the pressure loss, the coating density $D_2$ in the second catalytic layer 262 is generally 150 g/L or lower, preferably 100 g/L or lower, or more preferably 90 g/L or lower, for instance, 80 g/L or lower. In another preferable example, the coating density $D_2$ in the second catalytic layer 262 is generally 50 g/L or higher, preferably 60 g/L or higher, or more preferably 70 g/L or higher, for instance, 75 g/L or higher.

The first catalytic layer 261 is formed in the interior of partition wall 26 in contact with entrance cell 24, from the exhaust inlet-side end 24a in the running direction of partition wall 26.

The length $L_1$ of the first catalytic layer in the running direction is not particularly limited as long as it is less than the total length $L_w$ of partition wall 26 in the running direction (i.e. $L_1 < L_w$). When $L_1 < L_w$ is satisfied, the increase in pressure loss can be favorably reduced to bring the effects of this invention to a higher level. From such a standpoint, $L_1$ preferably satisfies $L_1 \leq 0.9 L_w$.

According to the studies by the present inventors, PM in exhaust gas is unlikely to pass through partition wall 26 and tends to accumulate near the exhaust outlet-side end 25a in entrance cell 24. Thus, in an internal portion of partition wall 26 in contact with entrance cell 24, it is preferable that the first catalytic layer 261 is absent in the vicinity of the exhaust outlet-side end 25a. This can favorably reduce the increase in pressure loss. From such a standpoint, $L_1$ $0.8 L_w$ is preferably satisfied, and $L_1 \leq 0.75 L_w$ is more preferably satisfied. In other words, in the interior of partition wall 26 in contact with entrance cell 24, it is preferable that the first catalytic layer 261 is not formed in the running direction from the exhaust outlet-side end 25a over at least 10% (preferably 20%, more preferably 25%) of $L_w$. In the embodiment shown in FIG. 3, $L_1 \approx 0.7 L_w$, and the first catalytic layer 261 is absent in the running direction from the exhaust outlet-side end 25a up to 30% of $L_w$.

In another preferable example, the length $L_1$ of the first catalytic layer 261 in the running direction satisfies $0.5 L_w \leq L_1$. This can further increase opportunities for contact between the exhaust gas and the catalytic metal upstream of exhaust gas purification catalyst 10 (in the first catalytic layer 261). As a result, active reactions to purify the exhaust gas can be caused; in particular, the purification performance with decreasing temperature can be enhanced. In addition, it is also effective in reducing exhaust gas emissions. Thus, the effects of this invention can be brought to a higher level. From such a standpoint is satisfies preferably $0.6L_w \leq L_1$, or more preferably $0.65L_w \leq L_1$.

The second catalytic layer 262 is formed in the interior of partition wall 26 in contact with exit cell 25, from the exhaust outlet-side end 25a in the running direction of partition wall 26.

The length $L_2$ of the second catalytic layer in the running direction is not particularly limited as long as it is less than the total length $L_w$ of partition wall 26 in the running direction (i.e. $L_2 < L_w$). When $L_2 < L_w$ is satisfied, the increase in pressure loss can be favorably reduced. From such a standpoint, $L_2$ preferably satisfies $L_2 \leq 0.9L_w$, or more preferably $L_2 \leq 0.8L_w$. In other words, in the interior of partition wall 26 in contact with exit cell 25, it is preferable that the second catalytic layer 262 is not formed in the running direction from the exhaust inlet-side end 24a over at least 10% (preferably 20%) of $L_w$. In the embodiment shown in FIG. 3, $L_2 \approx 0.5L_w$, and the second catalytic layer 262 is absent in the running direction from the exhaust inlet-side end 24a up to 50% of $L_w$.

Although it also depends on the length $L_1$ of the first catalytic layer 261, etc., it is particularly preferable to satisfy $0.4L_w < L_2 < 0.6L_w$ in an embodiment. This can combine reduction of pressure loss and the effects of this invention at a high level.

In a preferable embodiment, the total length $L_w$ of partition wall 26, the length $L_1$ of the first catalytic layer 261 and the length $L_2$ of the second catalytic layer 262 satisfy the next inequality $L_w < (L_1 + L_2) < 2L_w$. In other words, in the interior of partition wall 26, the first and second catalytic layers 261 and 262 partially overlap each other in the running direction. In the embodiment shown in FIG. 3, $L_1 + L_2 \approx 1.2L_w$. The first and second catalytic layers 261 and 262 are purposefully formed to partially overlap in the running direction so as to eliminate channels that run from entrance cell 24 through catalytic layer-free regions to reach exit cell 25. Thus, it can be made sure that the exhaust gas comes in contact with the catalytic layer(s) (the first catalytic layer 261 and/or the second catalytic layer 262). As a result, the exhaust gas can be more suitably purified (detoxified).

The length over which the two catalytic layers (the first and second catalytic layers 261 and 262) overlap in the running direction is not particularly limited because it could be different as well depending on, for instance, the thicknesses (the lengths in a direction perpendicular to the running direction) of the respective catalytic layers. Usually, the overlapping length is at least 2% of the total length $L_w$ of partition wall 26, typically at least 5%, or preferably at least 10%; it can be 40% of $L_w$ or less, preferably 30% or less, for instance, 20% or less. In particular, from the standpoint of reducing the increase in pressure loss while bringing the effects of this invention to a higher level, it is preferably about 10% to 30% (especially about 10% to 20%) of the total length $L_w$ of partition wall 26. In other words, $L_w$, $L_1$ and $L_2$ preferably satisfy the next inequality $1.1 L_w \leq (L_1 + L_2) \leq 1.3L_w$.

The thicknesses (the lengths in a direction perpendicular to the running direction) of the first or second catalytic layers 261 and 262 are not particularly limited because it could be different as well depending on, for instance, the thickness of partition wall 26 and the length of each catalytic layer in the running direction. The first and second catalytic layer 261 and 262 are typically formed thinner than the total thickness $T_w$ of partition wall 26.

In other words, the first catalytic layer 261 is formed thinner than the total thickness $T_w$ of partition wall 26 so that it is in contact with entrance cell 24, but not in contact with exit cell 25 (i.e. $T_1 < T_w$). That is, the first catalytic layer 261 is preferably localized towards entrance cell 24 inside partition wall 26. The second catalytic layer 262 is formed thinner than the total thickness $T_w$ of partition wall 26 so that it is in contact with exit cell 25, but not in contact with entrance cell 24 (i.e. $T_2 < T_w$). In other words, the second catalytic layer 262 is preferably localized to the side of exit cell 25 in partition wall 26.

The respective thicknesses $T_1$ and $T_2$ of the first and second catalytic layers 261 and 262 can be generally at least 20% of the total thickness $T_w$ of partition wall 26, typically at least 30%, or preferably at least 40%, for instance, at least 50%; and it can be, for instance, 90% or less, typically 80% or less. This can combine a decrease in pressure loss and greater retention of purification performance, at a higher level. In the embodiment shown in FIG. 3, $T_1 = T_2 \approx 0.8T_w$.

The thickness $T_1$ of the first catalytic layer 261 can be the same as or different from the thickness $T_2$ of the second catalytic layer 262.

In a favorable embodiment, in the internal portion of partition wall 26 in contact with entrance cell 24, both the first catalytic layer 261 and the second catalytic layer 262 are absent in the running direction from the exhaust outlet-side end 25a up to at least 10% (preferably 20%) of $T_w$.

In another favorable embodiment, in the internal portion of partition wall 26 in contact with exit cell 25, both the first catalytic layer 261 and the second catalytic layer 262 are absent in the running direction from the exhaust inlet-side end 24a up to at least 10% (preferably 20%) of $T_w$.

According to such an embodiment, the pressure loss can be reduced to a greater extent.

In a favorable embodiment, $T_1$ and $T_2$ are comparable, or $T_2$ is greater than $T_1$. For instance, the next inequality $1 \leq T_2/T_1 \leq 1.5$ is satisfied, and typically, the next inequality $1 \leq T_2/T_1 \leq 1.2$ is satisfied. According to such an embodiment, the difference in pressure loss between the first and second catalytic layers 261 and 262 can be large, whereby the effects of this invention can be brought to a higher level.

In another favorable embodiment, the total thickness $T_w$ of the partition wall, the thickness $T_1$ of the first catalytic layer 261 and the thickness $T_2$ of the second catalytic layer 262 satisfy the next inequality $T_w < (T_1 + T_2) < 2T_w$. In other words, in the interior of partition wall 26, the first and second catalytic layers 261 and 262 partially overlap each other in the thickness direction. In the embodiment shown in FIG. 3, $T_1 + T_2 \approx 1.6T_w$. This can more effectively reduce exhaust gas emissions.

In the interior of partition wall 26 in contact with entrance cell 24, exhaust gas purification catalyst 10 has a first substrate-exposing segment 26N₁ in an area near (typically next to) the exhaust outlet-side end 25a. The first substrate-exposing segment 26N₁ is free of the first and second catalytic layers 261 and 262. With the inclusion of the first substrate-exposing segment 26N₁, the pressure loss can be more certainly reduced to a low level.

The dimensions (length and thickness) of the first substrate-exposing segment 26N₁ are not particularly limited. For instance, they can be selected in view of the properties of the substrate and the application (e.g. the expected amount of PM formed and the engine power). In a favorable example, the length of the first substrate-exposing segment $26N_1$ is at least $0.1L_w$ in the running direction from the exhaust outlet-side end 25a, and generally less than $0.5L_w$, for instance, $0.1 L_w$ to $0.3L_w$. In another favorable example, the thickness of the first substrate-exposing segment $26N_1$ is at least $0.1 T_w$ from the surface in contact with entrance cell 24, for instance, $0.1T_w$ to $0.3T_w$. In such an embodiment, while improving the retention of purification performance, the pressure loss can be further reduced. Thus, the effects of this invention can be brought to a higher level.

In a favorable embodiment, in the interior of partition wall 26 in contact with exit cell 25, catalyst 10 has a second substrate-exposing segment $26N_2$ in an area near (typically next to) the exhaust inlet-side end 24a. By this, the increase in pressure loss can be effectively reduced even when, for instance, the first catalytic layer 261 has a relatively high coating density (absolute value). Thus, the effects of this invention can be brought to a higher level.

The dimensions (length and thickness) of the second substrate-exposing segment $26N_2$ are not particularly limited. For instance, they can be selected in view of the properties of the substrate and the application (e.g. the expected amount of PM formed and the engine power). In a favorable example, the length of the second substrate-exposing segment $26N_2$ is at least $0.1L_w$ in the running direction from the exhaust outlet-side end 25a, for instance, $0.1L_w$ to $0.3L_w$, and preferably $0.4L_w$ to $0.6L_w$. In another favorable example, the thickness of the second substrate-exposing segment $26N_2$ is at least $0.1T_w$ from the surface in contact with exit cell 25, for instance, $0.1T_w$ to $0.3T_w$. In such an embodiment, while improving the retention of purification performance, the pressure loss can be further reduced. Thus, the effects of this invention can be brought to a higher level.

For instance, when the lengths of the two catalytic layers satisfy the next inequality $L_w<(L_1+L_2)$, or when the thicknesses of the two catalytic layers satisfy the next inequality $T_w<(T_1+T_2)$, the first substrate-exposing segment $26N_1$ can be provided not only to areas near the exhaust outlet-side end 25a, but also over a greater region. The first and second substrate-exposing segments $26N_1$ and $26N_2$ can be one three-dimensionally-joined unit.

Such catalytic layers can be formed by the same methods as in the conventional art. For instance, two catalytic layers (the first and second catalytic layers 261 and 262) as shown in FIG. 3 can be formed as follows:

First, a substrate as shown in FIGS. 1 and 2 is obtained. Two different catalytic layer-forming slurries (i.e. a first catalytic layer-forming slurry and a second catalytic layer-forming slurry) are then prepared. Each catalytic layer-forming slurry comprises a desirable catalytic metal component (typically a solution containing ions of a catalytic metal such as Pd, Pt, and Rh) and desirable carrier powder (typically, alumina, zirconia, a CZ composite oxide, etc.) as essential components and may further comprise other optional components (e.g. an oxygen storage material as a promoter). The properties (viscosity, non-volatile content, etc.) of the slurry can be adjusted in view of the dimensions of the substrate used, the porosity of partition wall 26, the properties of the catalytic layer to be formed, etc.

Subsequently, the prepared first catalytic layer-forming slurry is supplied via the exhaust inlet-side end 24a of the substrate up to the length $L_1$ in the running direction into entrance cell 24. This forms the first catalytic layer 261 with desirable properties in pores of partition wall 26 in contact with entrance cell 24. The properties (e.g. coating density $D_1$, porosity) of the first catalytic layer 261 can be adjusted by the properties, the supplied amount and the number of supplies of the first catalytic layer-forming slurry, etc. For instance, to decrease the coating density $D_1$, it is effective to decrease the viscosity, the non-volatile content, the supplied amount, and the number of supplies of the slurry, and so on. The thickness $T_1$ of the first catalytic layer 261 can be adjusted by applying pressure to exit cell 25 when supplying the slurry so as to create a pressure gradient between entrance cell 24 and exit cell 25, etc. The slurry can be supplied, dried, and calcined in the same manner as in the conventional catalytic layer formation.

The second catalytic layer-forming slurry prepared above is then supplied via the exhaust outlet-side end 25a of the substrate up to the length $L_2$ in the running direction into exit cell 25. This forms the second catalytic layer 262 with desirable properties in pores of partition wall 26 in contact with exit cell 25. The properties (e.g. coating density $D_2$, porosity) and the thickness $T_2$ of the second catalytic layer 262 can be adjusted in the same manner as in the formation of the first catalytic layer 261, by the properties, the supplied amount, the number of supplies, and the supply time of the second catalytic layer-forming slurry as well as a pressure gradient created between entrance cell 24 and exit cell 25, etc.

After provided with the catalytic layer-forming slurries, the honeycomb substrate is dried and calcined at prescribed temperatures for prescribed time periods. By this, two catalytic layers (the first and second catalytic layers 261 and 262) can be formed as shown in FIG. 3.

Described above is a method where the properties, the supplied amounts and the number of supplies of two different catalytic layer-forming slurries are varied to form two catalytic layers with different coating densities, but it is not limited to this. For instance, two catalytic layers with different coating densities can also be formed by using different carriers (in type and properties) in the two catalytic layer-forming slurries.

The exhaust gas purification catalyst 10 disclosed herein can stably exhibit excellent exhaust gas purification performance for a long period while reducing the increase in pressure loss. Accordingly, it can be favorably placed in an exhaust system (exhaust pipe) of, for instance, a gasoline engine or a diesel engine of an automobile. In particular, it can be favorably used in an eco-friendly car equipped with an energy-saving system that stops and restarts the engine repeatedly even while driving.

Described below are Examples related to the present invention. The present invention is not, however, limited to these specific Examples.

Example 1

As a honeycomb substrate, was obtained a cordierite wall-flow substrate (300 cpsi (number of cells per square inch), 0.9 L capacity, 105 mm total length, 103 mm outer diameter, 0.3 mm partition wall thickness, 59% porosity in partition wall) as shown in FIGS. 1 and 2.

Subsequently, were mixed 40 g of $Al_2O_3$ powder ($\gamma$-$Al_2O_3$) as a carrier, rhodium nitrate with 0.2 g Rh content, and a suitable amount of ion-exchanged water. The resulting mixture was dried and then calcined (at 500° C. for one hour) to obtain a Rh-carrying $Al_2O_3$ powder. With ion-exchanged water, were mixed the resulting powder and a ceria-zirconia composite oxide in an amount to yield 60 g of CZ composite oxide upon calcination to prepare a first catalytic layer-forming slurry.

The prepared first catalytic layer-forming slurry was then supplied into the entrance cells via the exhaust inlet-side end of the honeycomb substrate and allowed to dry to form a first catalytic layer (length $L_1$ in running direction=70% of total length $L_w$ of partition wall, thickness $T_1$=80% of total thickness $T_w$ of partition wall) in pores of partition walls in contact with the entrance cells. During this, by means of gas supplied from the exhaust outlet-side end of the exit cells, a relative pressure gradient was created between the entrance cells and the exit cells to adjust the depth of the slurry impregnated into the partition walls. In Example 1, the coating density $D_1$ of the first catalytic layer per L of substrate was 65 g/L.

Using a palladium source (palladium nitrate) as the catalytic metal, but otherwise in the same manner as for the first catalytic layer-forming slurry, was prepared a second catalytic layer-forming slurry.

The prepared second catalytic layer-forming slurry was then supplied into the exit cells via the exhaust outlet-side end of the honeycomb substrate and allowed to dry to form a second catalytic layer (length $L_2$ in running direction=50% of total length $L_w$ of partition wall, thickness $T_2$=80% of total thickness $T_w$ of partition wall). During this, in the same manner as in the formation of the first catalytic layer, by means of gas supplied from the exhaust outlet-side end of the exit cells, a relative pressure gradient was created between the entrance cells and the exit cells to adjust the depth of the slurry impregnated into the partition walls. In Example 1, the coating density $D_2$ of the second catalytic layer per L of substrate was 70 g/L. In other words, the coating density ratio ($D_2/D_1$) was 1.08. The catalytic metal-carrying rates were the same between the first and second catalytic layers.

The honeycomb substrate provided with the first and second catalytic layers was allowed to dry at 150° C. for one hour and then calcined at 500° C. for one hour to obtain an exhaust gas purification catalyst (Ex. 1).

In the exhaust gas purification catalyst of Example 1, in the running direction of the partition walls, the first and second catalytic layers overlap over a length equivalent to 20% of the total length $L_w$ of a partition wall. That is, $L_1+L_2=1.2L_w$. In the thickness direction of the partition walls, the first and second catalytic layers also overlap through a thickness equivalent to 60% of the total thickness $T_w$ of a partition wall. That is, $T_1+T_2=1.6T_w$. The exhaust gas purification catalyst of Example 1 has first substrate-exposing segments in the interior of the partition walls in contact with the entrance cells. The first substrate-exposing segments are provided over a length of $0.3L_w$ (30% of $L_w$) in the running direction from the exhaust outlet-side end and through a thickness $0.2T_w$ (20% of $T_w$) in the thickness direction from the surface in contact with the entrance cells. In the interior of the partition walls in contact with the exit cells, the exhaust gas purification catalyst of Example 1 has second substrate-exposing segments. The second substrate-exposing segments are provided over a length of $0.5L_w$ (50% of $L_w$) in the running direction from the exhaust inlet-side end and through a thickness $0.2T_w$ (20% of $T_w$) in the thickness direction from the surface in contact with the exit cells.

Examples 2 to 4, Reference Examples 1 and 2

The properties (viscosity and non-volatile content) of the second catalytic layer-forming slurry and the number of supplies were adjusted so as to obtain the coating density values of the second catalytic layers shown in Table 1 below. Otherwise in the same manner as in Example 1, were fabricated an exhaust gas purification catalysts (Exs. 2 to 4, Ref Exs. 1 and 2). The amounts of catalytic metals carried in the catalytic layers were the same in all Examples.

Example 5

The lengths $L_1$ and $L_2$ of the first and second catalytic layers in the running direction were adjusted to the values shown in Table 1 below. Otherwise in the same manner as in Example 2, was fabricated an exhaust gas purification catalyst (Ex. 5).

Table 1 below summarizes the features of the catalytic layers.

TABLE 1

Features of catalytic layers and test results

| | First catalytic layer | | | | Second catalytic layer | | | | | Performance test | | |
| --- | --- | --- | --- | --- | --- | --- | --- | --- | --- | --- | --- | --- |
| | $M_{CAT}$ | $L_1$ (%) | $T_1$ (%) | $D_1$ (g/L) | $M_{CAT}$ | $L_2$ (%) | $T_2$ (%) | $D_2$ (g/L) | $D_2/D_1$ | $-\Delta T$*[1] (FIG. 4) $NO_x\_T50$ | $+\Delta T$*[3] (FIG. 5) (° C.) | Pressure loss*[3] (FIG. 6) |
| Ref. Ex. 1 | Rh | 70 | 80 | 65 | Pd | 50 | 80 | 45 | 0.69 | 349 | 310.6 | 0.86 |
| Ref. Ex. 2 | | | | | | | | 65 | 1.00 | 344.6 | 298.3 | 1 |
| Ex. 1 | | | | | | | | 70 | 1.08 | 343.1 | 293.3 | 1.04 |
| Ex. 2 | | | | | | | | 75 | 1.15 | 341.3 | 293.2 | 1.07 |
| Ex. 3 | | | | | | | | 80 | 1.23 | 339.6 | 290.85 | 1.08 |
| Ex. 4 | | | | | | | | 90 | 1.38 | 338.4 | 289.85 | 1.2 |
| Ex. 5 | | 50 | | | | 70 | | 75 | 1.15 | 333.1 | 299.1 | 1.09 |

$M_{CAT}$: Catalytic metal
*[1]ΔT: Under temperature lowering
*[2]ΔT: Under temperature elevation
*[3]Relative values with the pressure loss of Reference Example 2 being 1

<Evaluation of Exhaust Gas Purification Performance>

Figure 4:
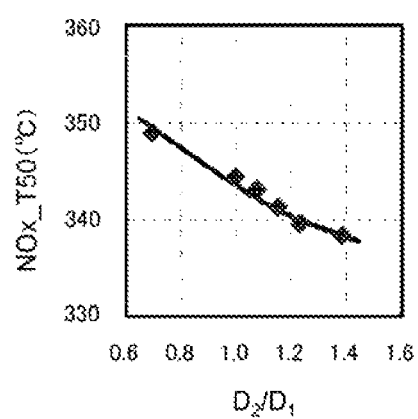
FIG. 4 shows a plot comparing exhaust gas purification performance ($NO_x$ $T_{50}$) under temperature elevation.
Figure 5:
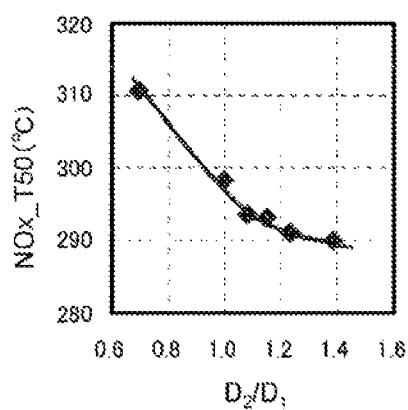
FIG. 5 shows a plot comparing exhaust gas purification performance ($NO_x$ $T_{50}$) under temperature lowering.

Each of the resulting exhaust gas purification catalysts was installed in a gasoline engine exhaust pipe. The exhaust gas purification performance was compared under temperature elevation and under temperature lowering. In particular, the exhaust gas purification catalyst was placed in the exhaust system of an engine bench. Using a heat exchanger, the catalyst entrance gas temperature was increased at 50° C./min from 150° C. During this, from the catalyst entrance gas concentration and exit gas concentration, was determined the temperature ($NO_x\_T50$) corresponding to 50% purification of $NO_x$ under temperature elevation. Also, using a heat exchanger, the catalyst entrance gas temperature was decreased at 50° C./min from 500° C. During this, from the catalyst entrance gas concentration and exit gas concentration, was determined the temperature ($NO_x\_T50$) corresponding to 50% purification of $NO_x$ under temperature lowering. The results are shown in the corresponding column in Table 1. FIG. 4 shows a plot comparing $NO_x\_T50$ under temperature elevation with respect to Reference Examples 1, 2 and Examples 1 to 4. FIG. 5 shows a plot comparing $NO_x\_T50$ under temperature lowering with respect to Reference Examples 1, 2, and Examples 1 to 4.

As evident from Table 1 and FIGS. 4 and 5, $NO_x\_T50$ was relatively high in Reference Examples 1 and 2 where the second catalytic layer to first catalytic layer coating density ratio ($D_2/D_1$) was 1 or lower. On the other hand, in Examples 1 to 4 with the coating density ratio $D_2/D_1 \geq 1.01$ (e.g. $\geq 1.08$), $NO_x\_T50$ was relatively low under temperature elevation and under temperature lowering, indicative of greater catalytic activities. Especially, under temperature lowering, extremely low 50% purification temperatures were achieved with $NO_x\_T50$ below 295° C. In general, under temperature lowering, low-temperature exhaust gas flows in from the first catalytic layer side to decrease the catalyst temperature, reducing the catalytic activities. However, with respect to the exhaust gas purification catalysts of Examples 1 to 4, active purification reactions were obtained in the first catalytic layer 261 upstream of the exhaust gas. As a result, degradation of catalytic activities with decreasing catalyst temperature was inhibited and the catalyst temperature was kept high for a long period. Thus, the effects of this invention were more significant when the temperature was decreased.

In Example 5 where the length $L_1$ of the first catalytic layer was 50% of the total length $L_w$ of the partition wall, as compared to Example 2, $NO_x\_T50$ was relatively high under temperature elevation. This can be because, in this experiment, the Rh content was constant; and therefore, with the shorter length $L_1$ of the first catalytic layer, the Rh-carrying density of the first catalytic layer increased. On the other hand, in Example 5, $NO_x\_T50$ was lower than that of Example 2 under temperature lowering. One reason for this can be that because the length $L_1$ of the first catalytic layer was short (i.e. the first substrate-exposing segment was long), the second catalytic layer also allowed passage of the exhaust gas, diminishing the effects of the coating densities satisfying $D_1 < D_2$.

In an eco-friendly car equipped with an energy-saving system that stops and restarts the engine repeatedly even while driving, it is more important to enhance the exhaust gas purification performance under temperature lowering. Thus, when the art disclosed herein is applied to such an eco-friendly car, from the standpoint of increasing the exhaust gas purification performance under temperature lowering, in addition to the coating densities satisfying $D_1 < D_2$, it can be more preferable to make the length $L_1$ of the first catalytic layer greater than 50% of $L_w$ so that the exhaust gas prefers to flow through the first catalytic layer.

<Pressure Loss Test>

Figure 6:
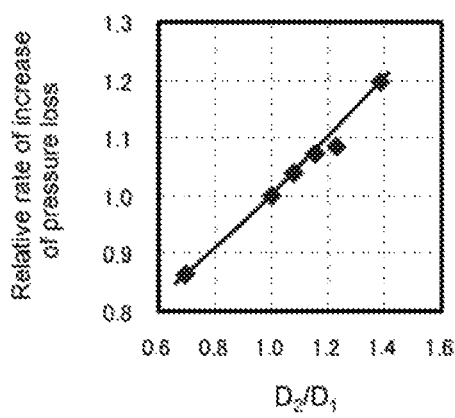
FIG. 6 shows a plot comparing rates of increase of pressure loss.

With respect to the resulting exhaust gas purification catalysts, rates of increase of pressure loss were determined. In particular, a reference honeycomb substrate prior to coating of catalytic layers was obtained. While a stream of air was passed through at 6 m³/min, the pressure was measured. Similarly to the reference, using each exhaust gas purification catalyst (each honeycomb substrate with catalytic layers) fabricated above, the pressure was measured while a stream of air was passed through at 6 m³/min. The rate (%) of increase of pressure loss was determined by the next expression [(pressure of exhaust gas purification catalyst−pressure of reference)/pressure of reference]×100. The results are shown in Table 1. Here, the relative values are shown with the rate of increase of pressure loss of Reference Example 2 being 1.0. FIG. 6 shows a plot comparing rates of increase of pressure loss with respect to Reference Examples 1 and 2 with Examples 1 to 4.

As evident from Table 1 and FIG. 6, the pressure loss had a tendency to increase with increasing coating density ratio ($D_2/D_1$). When the coating density ratio ($D_2/D_1$) was 1.4 or lower (e.g. 138 or lower, preferably 13 or lower, especially 1.23 or lower), the increase in pressure loss was suitably reduced.

Specific embodiments of the present invention are described above, but these are merely for illustration and do not limit the scope of the claims. The art according to the claims include various modifications and changes made to the specific embodiments illustrated above.

REFERENCE SIGNS LIST

1 honeycomb substrate
1a end
2 closed section
4 opening
6, 26 partition walls
10 exhaust gas purification catalyst
22 plug
24 entrance cell
24a exhaust inlet-side end
25 exit cells
25a exhaust outlet-side end
261 first catalytic layer
262 second catalytic layer
26N₁ first substrate-exposing segment
26N₂ second substrate-exposing segment

The invention claimed is:

1. A wall-flow-type exhaust gas purification catalyst to be placed in an exhaust pipe of an internal combustion system to purify exhaust gas emitted from the internal combustion system, the exhaust gas purification catalyst comprising:
a substrate having a wall-flow structure with an exhaust inlet-side end and an exhaust outlet-side end, the substrate having an entrance cell that is open on the exhaust inlet-side end and an exit cell that is open on the exhaust outlet-side end, separated with a porous partition wall,
a first catalytic layer provided to an internal portion of the partition wall in contact with the entrance cell, having a length $L_1$ from the exhaust inlet-side end in the running direction of the partition wall with $L_1$ being less than the total length $L_w$ of the partition wall in the running direction,
a second catalytic layer provided to an internal portion of the partition wall in contact with the exit cell, having a length $L_2$ from the exhaust outlet-side end in the running direction of the partition wall with $L_2$ being less than the total length $L_w$ of the partition wall in the running direction; wherein
in the internal portion of the partition wall in contact with the entrance cell, near the exhaust outlet-side end, the exhaust gas purification catalyst has a substrate-exposing segment free of the first and second catalytic layers, and the first catalytic layer has a coating density $D_1$ and the second catalytic layer has a coating density $D_2$ with a $D_2/D_1$ ratio value of 1.01 or higher, but 1.4 or lower.

2. The exhaust gas purification catalyst according to claim 1 wherein the length $L_1$ of the first catalytic layer in the running direction satisfies $0.5L_w < L_1 < L_w$.

3. The exhaust gas purification catalyst according to claim 1 wherein $D_2/D_1$ is 1.1 or higher, but 1.3 or lower.

4. The exhaust gas purification catalyst according to claim 1 wherein the first and second catalytic layers are formed to partially overlap each other in the running direction, with $L_w$, $L_1$ and $L_2$ satisfying the next inequality:

$$L_w < (L_1 + L_2) < 2L_w.$$

5. The exhaust gas purification catalyst according to claim 4 wherein $L_w$, $L_1$ and $L_2$ satisfy the next inequality:

$$1.1L_w \le (L_1 + L_2) \le 1.3L_w.$$

6. The exhaust gas purification catalyst according to claim 1 wherein the partition wall has a total thickness $T_w$ in a direction perpendicular to the running direction of the partition wall, the first catalytic layer has a thickness $T_1$, the second catalytic layer has a thickness $T_2$, and the first and second catalytic layers are formed to partially overlap each other in the thickness direction, with $T_w$, $T_1$ and $T_2$ satisfying the next inequality:

$$T_w < (T_1 + T_2) < 2T_w.$$

7. The exhaust gas purification catalyst according to claim 1 wherein $D_1$ is 40 g/L or higher, but 100 g/L or lower.

8. The exhaust gas purification catalyst according to claim 1 wherein the first catalytic layer comprises rhodium.

9. The exhaust gas purification catalyst according to claim 1 wherein the second catalytic layer comprises palladium.

10. The exhaust gas purification catalyst according to claim 1, wherein the first catalytic layer and the second catalytic layer are unevenly distributed in the internal portion of the partition wall.

11. The exhaust gas purification catalyst according to claim 1, wherein when a partition wall cross section of the first catalytic layer is analyzed under an electron microscope, with the overall coating density over a length $0.1L_w$ from the exhaust inlet-side end in the running direction being 100%, the density distribution of the first catalytic layer present in the inside of the partition wall is 80% or higher, and when a partition wall cross section of the second catalytic layer is analyzed under an electron microscope, with the overall coating density over a length $0.1L_w$ from the exhaust outlet-side end in the running direction being 100%, the density distribution of the second catalytic layer present in the inside of the partition wall is 80% or higher.

* * * * *